United States Patent [19]
Yamagishi et al.

[11] Patent Number: 5,025,638
[45] Date of Patent: Jun. 25, 1991

[54] DUCT TYPE AIR CONDITIONER AND METHOD OF CONTROLLING THE SAME

[75] Inventors: Katsuaki Yamagishi, Yokohama; Koichi Matsui, Tokyo; Toshimasa Tanaka, Ebina; Nobuo Matsui, Yokohama; Sei Suma, Fuji; Yoshihito Mino, Shizuoka, all of Japan

[73] Assignee: Kabushiki Kaisha Toshiba, Kawasaki, Japan

[21] Appl. No.: 500,599

[22] Filed: Mar. 28, 1990

[30] Foreign Application Priority Data

Mar. 30, 1989 [JP] Japan ................................. 1-76516

[51] Int. Cl.⁵ ............................................. F25D 17/00
[52] U.S. Cl. ...................................... 62/180; 62/227; 236/49.3
[58] Field of Search ................. 62/227 X, 228.4, 180; 236/493

[56] References Cited

U.S. PATENT DOCUMENTS 4,821,526  4/1989  Otsuka et al. ...................... 236/49.3
4,850,200  7/1989  Sugiyama ........................... 62/227 X Primary Examiner—William E. Wayner
Attorney, Agent, or Firm—Oblon, Spivak, McClelland, Maier & Neustadt

[57] ABSTRACT

A refrigeration cycle is a closed cycle constituted by a variable power compressor, a four-way valve, an indoor heat exchanger, an expansion valve and an outdoor heat exchanger. Air-conditioned air is supplied from the refrigeration cycle to a plurality of rooms to be subjected to air conditioning through a supply duct at a portion near a supply opening for supplying the air-conditioned air to a corresponding one of the rooms and controls a flow amount of the air-conditioned air supplied from the supply opening. Air is returned from each room to the refrigeration cycle through a return duct. The indoor heat exchanger of the refrigeration cycle has a temperature sensor for detecting the temperature of the indoor heat exchanger. A system controller controls a drive frequency of the variable power compressor of the refrigeration cycle in accordance with a difference between the temperature of the indoor heat exchanger detected by the temperature sensor and a preset temperature of the indoor heat exchanger.

12 Claims, 11 Drawing Sheets

| CONTROL INFORMATION | OBJECT TO BE CONTROLLED |
|---|---|
| ROOM TEMPERATURE | DAMPER OPENING |
| INDOOR HEAT EXCHANGER TEMPERATURE | COMPRESSOR FREQUENCY |
| DAMPER OPENING | AIR VOLUME |

FIG. 3

| MAXIMUM DAMPER OPENING | ZONE | DATA CORRECTION TIMER (AIR VOLUME) |
|---|---|---|
| MORE THAN DAMPER KEEP ZONE AND LESS THAN 100(%) | 3 | +1 |
| DAMPER OPENING KEEP ZONE | 2 | 0 |
| LESS THAN DAMPER OPENING KEEP ZONE | 1 | -1 |

FIG. 10

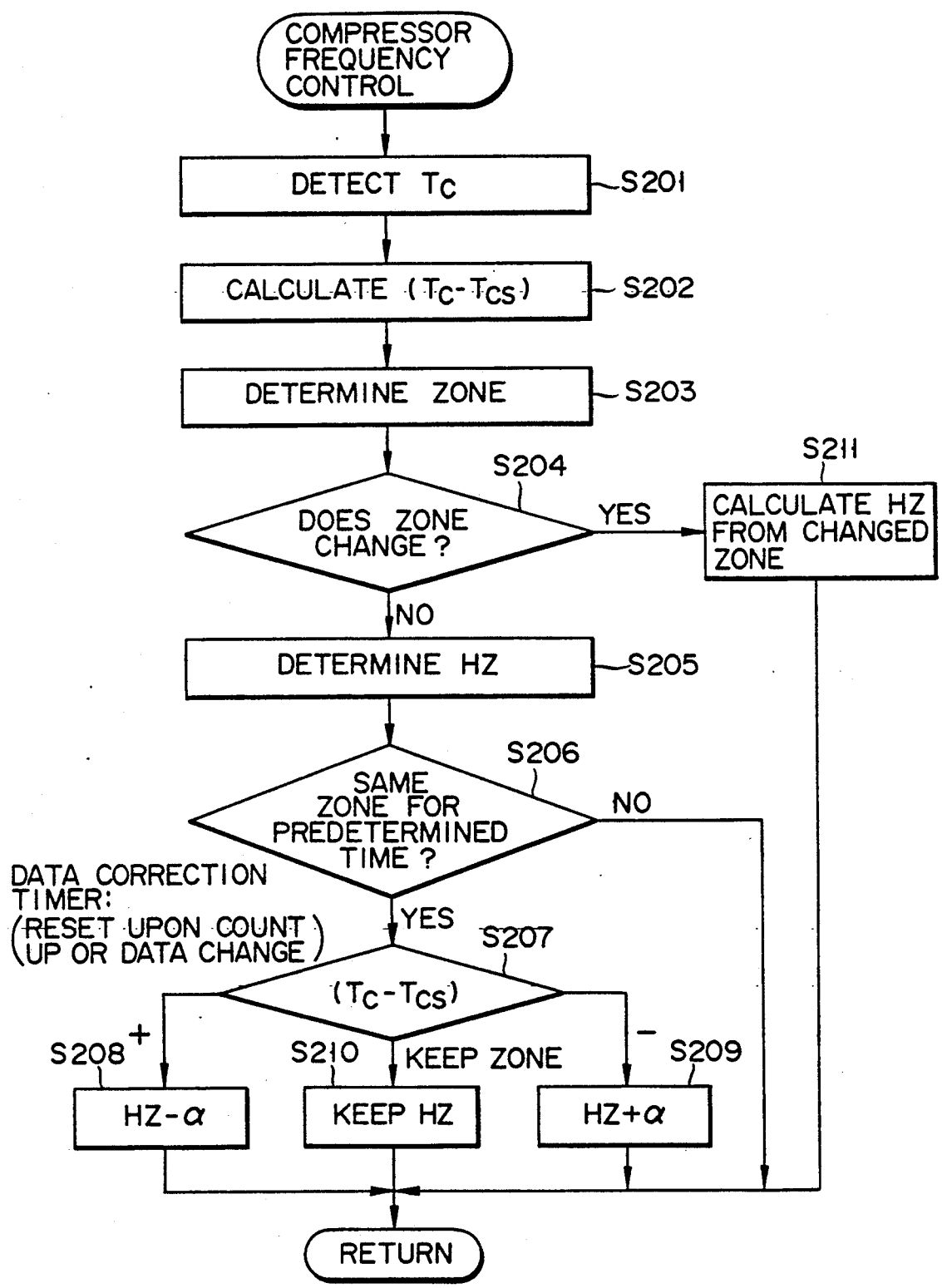
F I G. 5

DUCT TYPE AIR CONDITIONER AND METHOD OF CONTROLLING THE SAME

BACKGROUND OF THE INVENTION

1. Field of the Invention

The present invention relates to a duct type air conditioner and a method of controlling the same and, more particularly, to a supply temperature constant control method.

2. Description of the Related Art

In buildings and the like having a large number of rooms, a duct type air conditioner is adopted to distribute temperature-adjusted air to each room by using an air duct, thereby performing air conditioning. In recent years, as multi-purpose tenant buildings and the like are increased in number, a demand has increasingly arisen for a subdividing air conditioning system capable of adjusting a temperature or switching operations in accordance with an area or purpose of each room. Therefore, various improvements have been made in the duct type air conditioner in order to cope with such a demand As one of such improvements, a control method using a variable air volume control scheme (to be referred to as a VAV scheme hereinafter) as disclosed in Published Unexamined Japanese Patent Application No. 62-37632 or 62-194159 has been adapted. In this VAV scheme, the opening of a damper provided at a supply opening of each room is adjusted in accordance with the temperature of the room, and a supply air volume of a fan is controlled in accordance with a static pressure of an air circulating system which changes in accordance with the damper opening. In this manner, temperature control is performed by changing the air volume. In addition, a compressor is ON/OFF-controlled in accordance with a cooling/heating load (the number of rooms) independently of the air volume control.

FIG. 1 is a timing chart showing characteristics obtained when a duct type air conditioner adopting the above VAV scheme is applied to, e.g., four rooms. As can be understood from FIG. 1, during a high cooling-/heating load (four rooms) operation, a room temperature $T_a$ can be substantially set at a set room temperature $T_s$. During a low cooling/heating load (one room) operation, however, the room temperature $T_a$ largely varies with respect to the set room temperature $T_s$ since a compressor is ON/OFF-controlled. That is, when the conventional duct type air conditioner is used, a room temperature largely varies during the low cooling/heating load operation. In addition, since the opening of the damper is decreased during the low cooling/heating load operation, a duct pressure loss is increased to result in high operation noise.

In the conventional duct type air conditioner, a wind pressure is detected by a pressure sensor. Therefore, since only an average air volume to be supplied to each room can be detected, a required air volume cannot be supplied.

Recently, a duct type air conditioner which adopts compressor inverter control in addition to the above VAV scheme has been developed as disclosed in Published Unexamined Japanese Patent Application No. 62-22948. In such an air conditioner, however, since the frequency of an inverter for driving a compressor is selected in accordance with the opening of a damper, the opening of the damper and the frequency of the inverter cannot be controlled independently of each other. That is, when the damper opening is increased in order to decrease a duct pressure loss, the frequency of the inverter is also increased to consume unnecessarily high cooling/ heating power. Therefore, since the opening of the damper is decreased so as not to consume the unnecessarily high cooling/heating power during a low cooling/heating load operation, the duct pressure loss is increased as described above to result in high operation noise.

SUMMARY OF THE INVENTION

It is, therefore, an object of the present invention to provide a duct type air conditioner and a method of controlling the same, in which a variatic room temperature is small, a high efficiency can be realized even during a low cooling/heating load operation and operation noise is low.

According to the first aspect of the present invention, there is provided a duct type air conditioner comprising: heat exchanging means for receiving one of a high-temperature high-pressure refrigerant gas and a low-temperature low-pressure liquid refrigerant and heat-exchanging one of the received refrigerant gas and the received liquid refrigerant with air, thereby extracting one of condensation heat and evaporation heat; duct means for circulating air between a plurality of regions to be air-conditioned to be subjected to air conditioning and the heat exchanging means; a plurality of air volume control means, independently provided in the plurality of regions to be air-conditioned, for controlling a flow amount of air supplied from the heat exchanging means through the duct means; temperature detecting means for detecting a temperature of the refrigerant obtained by heat exchange of one of the refrigerant gas and the liquid refrigerant with air performed by the heat exchanging means; and control means for controlling a flow amount of one of the refrigerant gas and the liquid refrigerant to be supplied to the heat exchanging means in accordance with a difference between the temperature of the refrigerant detected by the temperature detecting means and a first set temperature and a holding time of the difference.

According to the second aspect of the present invention, there is provided a duct type air conditioner comprising: a refrigeration cycle as a closed cycle constituted by a variable power compressor, a four-way valve, an indoor heat exchanger, an expansion valve and an outdoor heat exchanger; an air supply duct for supplying air-conditioned air from the refrigerant cycle to each of a plurality of regions to be air-conditioned to be subjected to air conditioning, the air supply duct including a plurality of supply openings each for supplying the air-conditioned air to a corresponding one of the plurality of regions to be air-conditioned; a plurality of air volume control means, independently provided in the plurality of regions to be air-conditioned, for controlling flow amounts of the air-conditioned air supplied from the supply openings of the air supply duct, each of the plurality of air volume control means including a damper provided near the supply opening; a return duct for returning air from the plurality of regions to be air-conditioned to the refrigeration cycle; temperature detecting means for detecting a temperature of the indoor heat exchanger of the refrigerant cycle; and control means for controlling a drive frequency of the variable power compressor of the refrigerant cycle in accordance with a difference between the temperature of the indoor heat exchanger detected by the temperature detecting means and a preset temperature of the indoor heat exchanger.

According to the third aspect of the present invention, there is provided a method of controlling a duct type air conditioner, the duct type air conditioner comprising: indoor heat exchanging means for receiving one of a high-temperature high-pressure refrigerant gas and a low-temperature low-pressure liquid refrigerant and heat-exchanging one of the received refrigerant gas and the received liquid refrigerant with air, thereby extracting one of condensation heat and evaporation heat; flow amount varying means for varying a flow amount of one of the refrigerant gas and the liquid refrigerant to be supplied to the indoor heat exchanging means; duct means for circulating air between a plurality of regions to be air-conditioned to be subjected to air conditioning and the indoor heat exchanging means, the duct means including a plurality of supply openings for supplying air from the indoor heat exchanging means to the plurality of regions to be air-conditioned and a fan, provided in the duct means, for supplying air from the indoor heat exchanging means; a plurality of air volume control means, independently provided in the plurality of regions to be air-conditioned, for controlling flow amounts of air supplied from the indoor heat exchanging means through the duct means, each of the air volume control means including a damper provided near the supply opening; temperature detecting means for detecting a temperature of the refrigerant obtained by heat exchange of one of the refrigerant gas and the liquid refrigerant with air performed by the indoor heat exchanging means; and a plurality of temperature sensor means, each provided in a corresponding one of the regions to be air-conditioned to detect an intraregion temperature of the region to be air-conditioned, comprising the steps of: calculating a difference between the temperature of the refrigerant detected by the temperature detecting means and a first set temperature which is preset; determining, in accordance with the calculated difference, a flow amount of one of the refrigerant gas and the liquid refrigerant varied by the flow amount varying means and supplied to the heat exchanging means; calculating a difference between a temperature in each of the regions to be air-conditioned detected by a corresponding one of the plurality of temperature sensors and a corresponding one of second set temperatures which are preset for the respective regions to be air-conditioned; determining an opening of each of the dampers of the regions to be air-conditioned in accordance with a corresponding one of the calculated temperature differences; selecting a maximum damper opening of the determined damper openings; determining a rotational speed of the fan in accordance with the selected maximum damper opening; and controlling the first set temperature when cooling/heating power of the duct type air conditioner is higher than a cooling/heating load of the regions to be air-conditioned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Brief Description of the Drawings i The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a table showing a relationship between control information and an object to be controlled in the duct type air conditioner shown in FIG. 2;

FIG. 5 is a flow chart for explaining an operation of drive frequency control for a compressor shown in FIG. 2;

FIG. 10 is a control table for air volume control;

Detailed Description of the Preferred Embodiments

Figure 2:
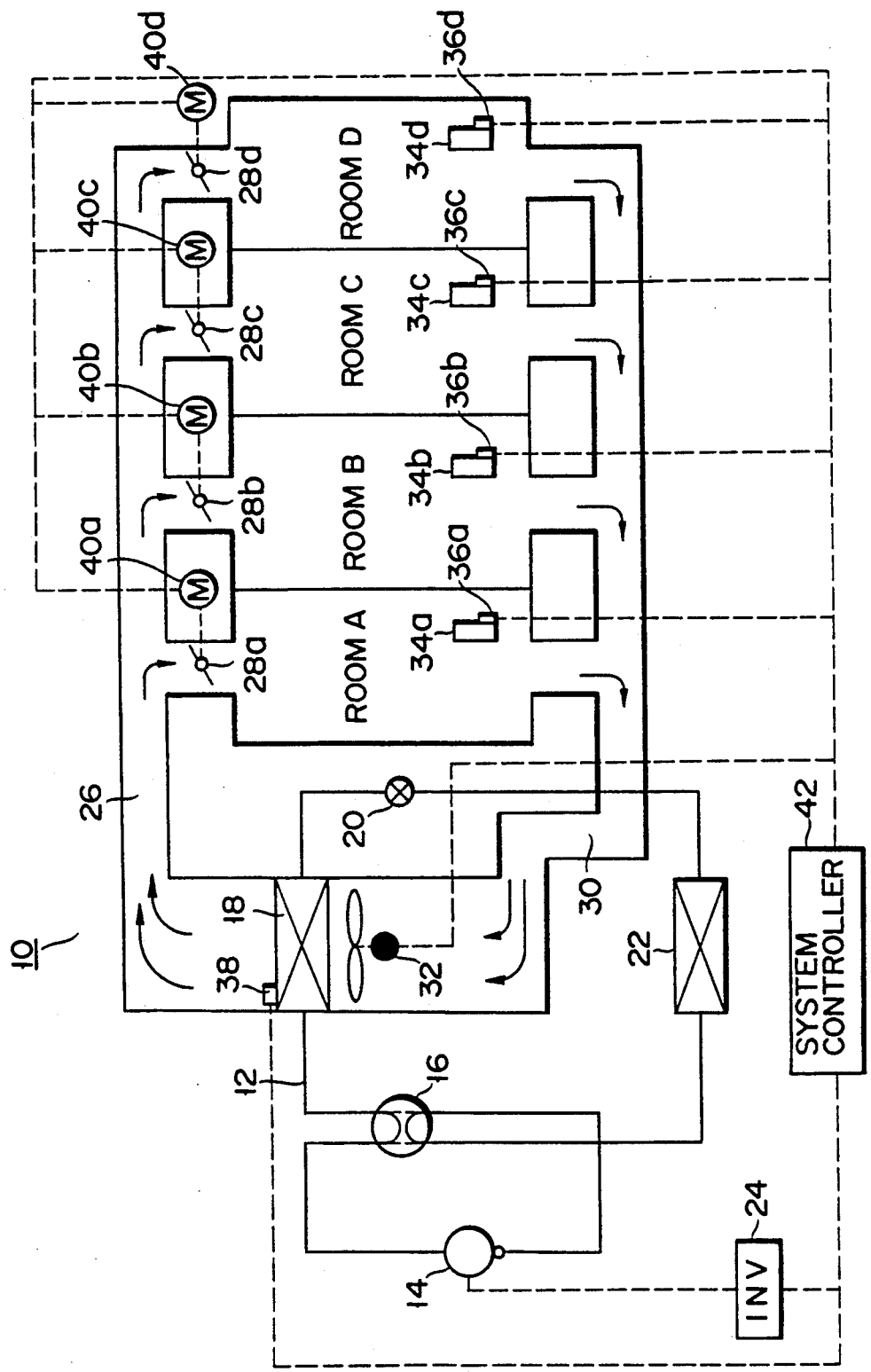
FIG. 2 is a block diagram showing an arrangement of a duct type air conditioner according to an embodiment of the present invention.

FIG. 2 shows a duct type air conditioner 10 according to an embodiment of the present invention. The air conditioner 10 has a refrigeration cycle 12 as a closed cycle constituted by a compressor 14, a four-way valve 16, an indoor heat exchanger 18, an expansion valve 20 and an outdoor heat exchanger 22. An inverter 24 is connected to the compressor 14 in order to variably drive the power of the compressor 14.

The air conditioner 10 also has an air supply duct 26 which branches into a plurality of ducts so as to supply air-conditioned air from the indoor heat exchanger 18 of the refrigeration cycle 12 to a plurality of rooms (in this embodiment, four rooms, i.e., rooms A, B, C and D). Dampers 28a, 28b, 28c and 28d as air volume control means are provided near supply openings of the air supply duct 26 to the respective rooms. The air conditioner 10 also includes a return duct 30 which branches into a plurality of ducts so as to return air flows returning from the respective rooms to the indoor heat exchanger 18 of the cycle 12, and a fan 32 provided to the heat exchanger 18.

Input devices 34a, 34b, 34c and 34d for inputting a desired room temperature and the like are provided in the respective rooms. Room temperature sensors 36a, 36b, 36c and 36d each for detecting a room temperature of a corresponding room are provided to the input devices 34a, 34b, 34c and 34d, respectively. A temperature sensor 38 as a temperature detecting means for detecting a condensation temperature or an evaporation temperature of the indoor heat exchanger 18 is provided to the heat exchanger 18. Stepping motors 40a, 40b, 40c and 40d are connected to the dampers 28a, 28b, 28c and 28d, respectively, to control the openings of the respective dampers.

The inverter 24, the fan 32, the room temperature sensors 36a to 36d, the temperature sensor 38 and the stepping motors 40a to 40d are connected to a system controller 42. The system controller 42 is realized as a microcomputer having a CPU or a memory. The system controller 42 performs control as shown in FIG. 3. That is, on the basis of information from the room temperature sensors 36a to 36d, the system controller 42 controls the stepping motors 40a to 40d to control the openings of the dampers 28a to 28d, respectively. On the basis of temperature information of the indoor heat exchanger 18 from the temperature sensor 38, the system controller 42 controls the frequency of the inverter 24 for driving the compressor 14, thereby controlling the frequency of the compressor 14. On the basis of the openings of the dampers 28a to 28d, the system controller 42 controls the fan 32 to control the air volume. These control operations will be described in detail later.

Note that although the number of rooms is four (rooms A, B, C and D) in FIG. 2, the present invention is not limited to this embodiment but can be applied to an arbitrary number of rooms.

An operation of the duct type air conditioner 10 having the above arrangement will be described below.

During a heating operation, for instance, the four-way valve 16 is switched to allow the indoor heat exchanger 18 to function as a condensor. Therefore, when the fan 32 is driven, hot air is obtained from the heat exchanger 18. This hot air is divided into the respective rooms through the air supply duct 26 and supplied into the rooms to perform hating after their air volumes are decreased by the dampers 28a to 28d. Air in each room is returned to the heat exchanger 18 through the return duct 30.

Figure 4:
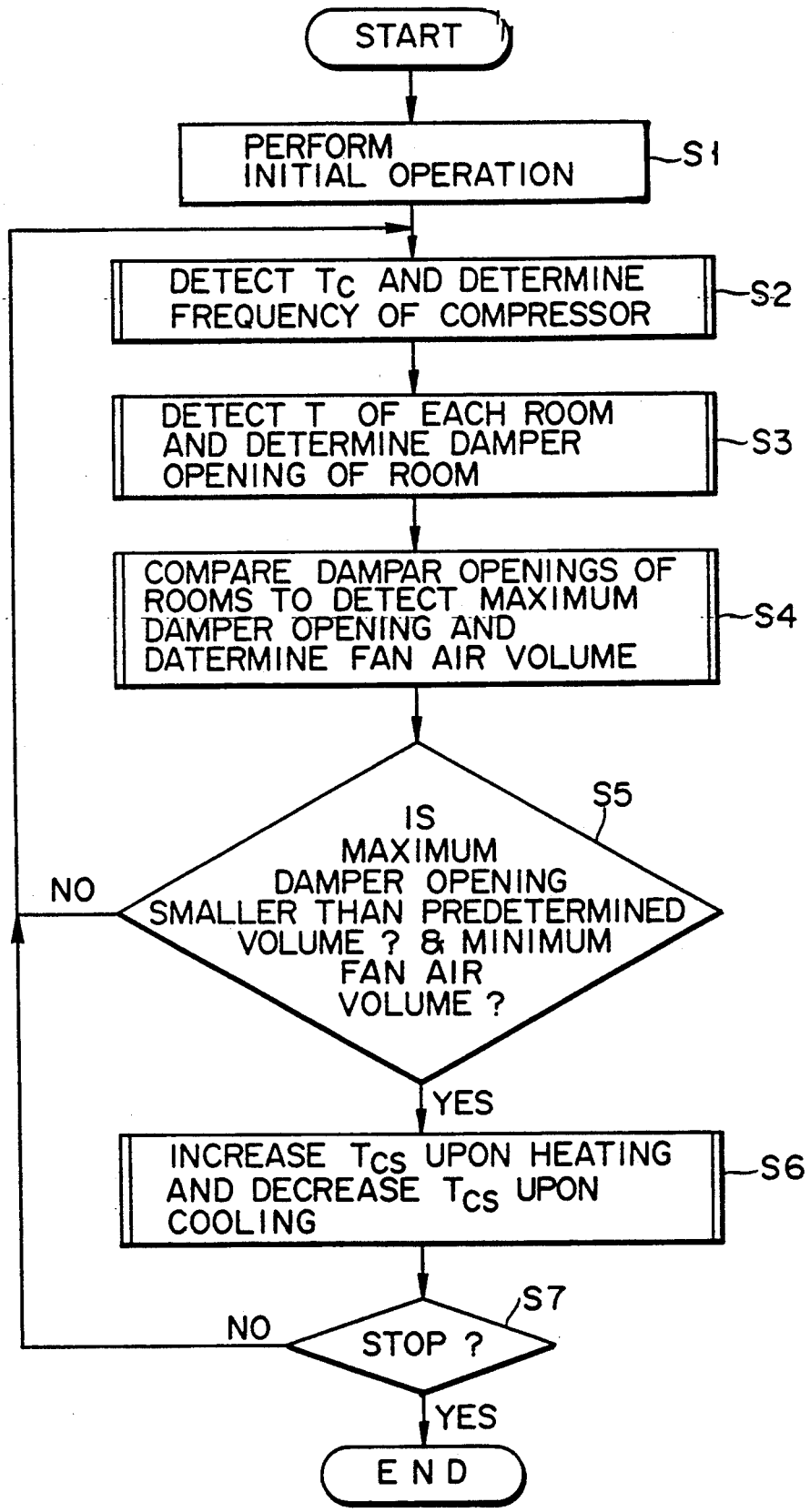
FIG. 4 is a flow chart for explaining an operation of a main program stored in a central processing unit shown in FIG. 2.

FIG. 4 is a schematic flow chart for explaining a main program stored in a memory (not shown) of the system controller 42. That is, when an ON/OFF switch (not shown) of one input device is turned on, i.e., when an operation start manipulation is performed, an initial operation is executed (step S1). In this initial operation, the inverter 24, the fan 32 and a stepping motor corresponding to the room having the input device subjected to the operation start manipulation are controlled to set a maximum frequency as the frequency of the compressor 14, to maximize the air volume of the fan 32 and to fully open the opening of a damper corresponding to the room having the manipulated input device. As a result, the room can be rapidly heated (cooled upon a cooling operation) to a certain temperature. When a room temperature Ta reaches a predetermined temperature, a steady operation is started.

In the steady operation, frequency control for the compressor 14 is performed (step S2). That is, the temperature sensor 38 detects a condensation temperature (evaporation temperature upon cooling) $T_c$ of the indoor heat exchanger 18. The temperature $T_c$ is compared with a set condensation temperature (set evaporation temperature upon cooling) $T_{cs}$ of the heat exchanger 18 set as will be described later to obtain a difference therebetween. In accordance with this difference, the frequency of the inverter 24 for driving the compressor 14 as a power variable compressor is determined, and the inverter 24 is controlled to obtain the determined frequency.

Opening control for the dampers is performed next (step S3). That is, room temperatures $T_a$ of rooms having the input device subjected to the operation start manipulation are detected by the room temperature sensors 36a to 36d. The room temperatures $T_a$ of the rooms are compared with set room temperatures $T_s$ set by the input devices 34a to 34d of the rooms, respectively, to obtain differences therebetween. In accordance with these differences, the openings of the dampers 28a to 28d of the rooms are determined, and the stepping motors 40a to 40d are controlled to obtain the determined openings, respectively.

Air volume control for the fan 32 is performed next (step S4). That is, the damper openings of the respective rooms are compared to detect a maximum damper opening. In accordance with the detected maximum damper opening, the air volume of the fan 32 is determined, and the fan 32 is controlled to obtain the determined air volume.

By the above control operations, the heating power (cooling power upon cooling) of the duct type air conditioner 10 is determined. If, however, the heating power of the air conditioner is higher than the heating load (cooling load upon cooling) of each room, a low power operation must be performed.

For this reason, the system controller 42 checks whether the maximum damper opening is smaller than a predetermined constant value and the fan air volume is minimum (step S5). If the heating power is higher than the heating load, the set condensation temperature $T_{cs}$ of the heat exchanger 18 is decreased (step S6). Similarly, if the cooling power is higher than the cooling load upon cooling, the set evaporation temperature $T_{cs}$ of the heat exchanger 18 is increased.

The above operation from steps S2 to S6 is repeated until the ON/OFF switches of the input devices 34a to 34d of all the rooms are turned off (step S7).

In this embodiment, the compressor frequency control (step S2) is performed prior to the damper opening control (step S3) so that the cooling/heating power can be controlled by the drive frequency of the compressor 14 while adjusting the dampers 28a to 28d as least as possible. This is because a pressure loss is small when the dampers 28a to 28d are kept in a full open state. The present invention, however, is not limited to this order, but steps S2 and S3 may be performed in a reverse order.

The operation performed in steps S2, S3 and S4 includes a data correction timer operation to be described later with reference to FIGS. 5 to 10. That is, an operation keep zone having a highest frequency in which an operation can be performed with an optimal efficiency in accordance with an operation state or the opening of the damper with respect to a target heating operation is preset for each of the drive frequency control for the compressor 14, the opening control for the dampers 28a to 28d and the air volume control for the fan 32, and each control is performed in accordance with an independent pattern set in order to comfortably obtain the zone.

The operation from steps S2 to S4 including the data correction timer operation will be described in detail below.

Figure 6:
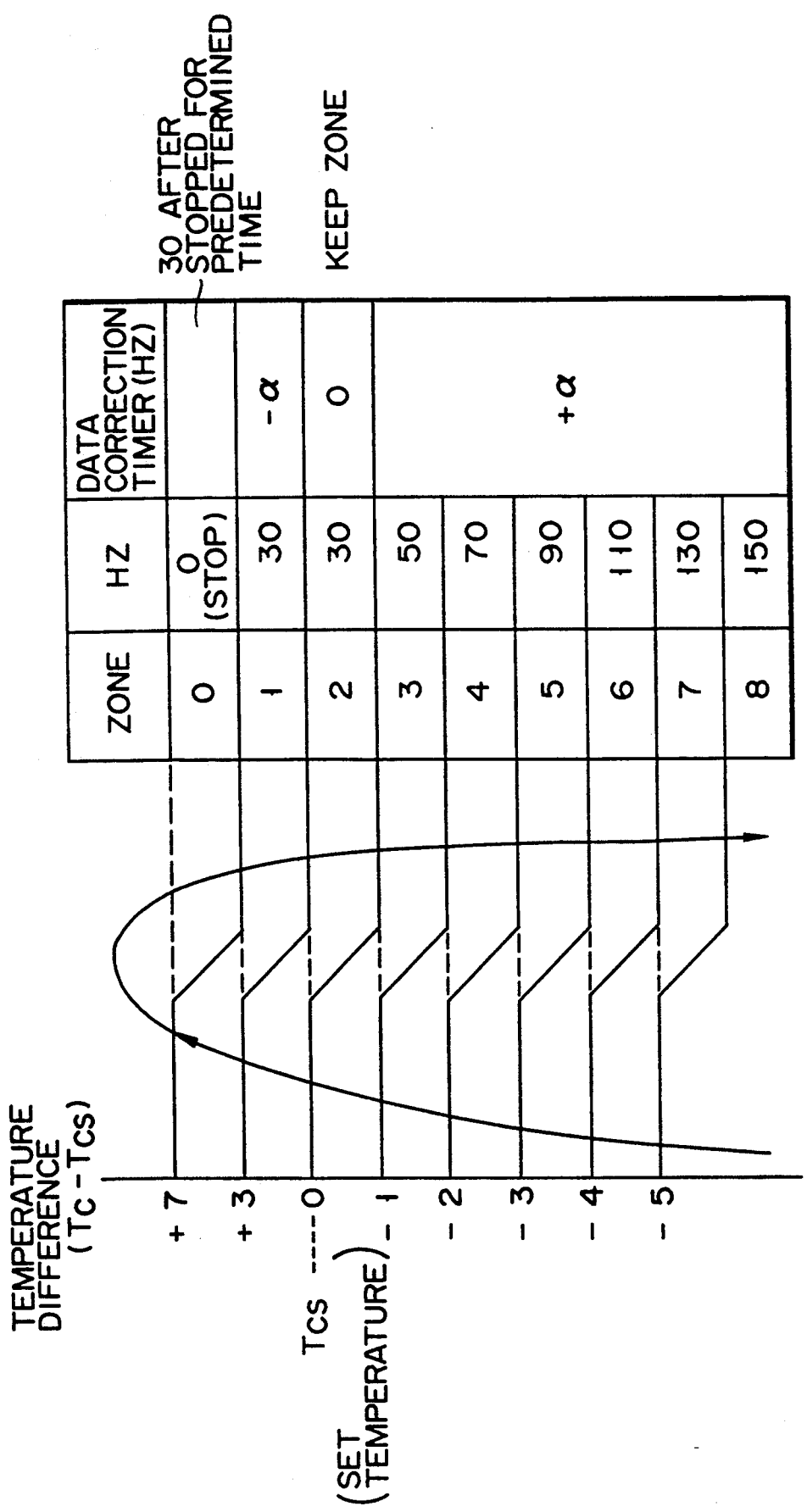
FIG. 6 is a graph showing characteristics of control based on correction data of a correction timer for determining a drive frequency of the compressor and a keep zone.

FIG. 5 is a flow chart for explaining an operation of the drive frequency control for the compressor 14 for driving the refrigeration cycle 12 provided in the duct type air conditioner 10 according to the embodiment of the present invention, and FIG. 6 is a graph showing characteristics of control based on correction data of a data correction timer for determining the drive frequency of the compressor 14 and a keep zone. A program according to this flow chart and a calculation table according to the graph are stored in a memory (not shown) of the system controller 42. FIG. 6 will be described first before the drive frequency control operation for the compressor 14 will be described with reference to the flow chart shown in FIG. 5. Referring to FIG. 6, a temperature difference between the actual condensation temperature $T_c$ and the set condensation temperature $T_{cs}$ of the indoor heat exchanger 18 is plotted along the ordinate, and operation zones corresponding to the respective temperature differences are shown. FIG. 6 also shows the drive frequency (Hz) of the compressor 14 determined by the operation zone and correction data of the data correction timer. In this case, the operation zones are set by dividing the temperature difference between the condensation temperature $T_c$ detected by the temperature sensor 38 and the set condensation temperature $T_{cs}$ by a certain temperature width. Even if the temperature difference is the same, different operation zones are set when the condensation temperature $T_c$ has positive and negative gradients. That is, when the the temperature $T_c$ shown in FIG. 6 has a positive gradient, operation zones are determined by temperature widths indicated by solid lines along the abscissa. When the temperature $T_c$ has a negative gradient, operation zones are determined by temperature widths indicated by broken lines along the abscissa. That is, operation zones are different when the temperature $T_c$ has positive and negative gradients even if the temperature difference is the same. In this case, drive frequencies of the compressor 14 are different and correction data of the data correction timer are also different. In FIG. 6, the term "keep zone" represents an optimal operation zone with respect to the target, i.e., an operation zone at the set condensation temperature $T_{cs}$ (a temperature of an operation state which preferably continues for the longest time period).

In this embodiment, the number of operation zones is nine. The number of operation zones, however, is not limited to this number but can be arbitrarily set. In this embodiment, a temperature width of each operation zone, e.g., the 5th operation zone is set as "$-2°$ C.$\leq$ 5th operation zone $< -3°$ C." when the condensation temperature $T_c$ has a positive gradient. The present invention, however, is not limited to this temperature width.

The drive frequency control operation for the compressor 14 will be described below with reference to the flow chart shown in FIG. 5. That is, upon heating, the temperature sensor 38 detects the condensation temperature $T_c$ of the indoor heat exchanger 18 (step S201). A temperature difference ($T_c - T_{cs}$) between the detected condensation temperature $T_c$ and the set condensation temperature $T_{cs}$ set in advance is (step S202). An operation zone is determined in accordance with the calculated temperature difference (step S203). In order to determine the operation zone, assume that a previous condensation temperature $T_c$ is stored in a memory (not shown) of the system controller 42. In this manner, the system controller 42 can determine whether the condensation temperature $T_c$ is rising or falling by comparing the condensation temperature detected in step S201 with the stored previous condensation temperature. If the determination result indicates that the temperature is rising and the temperature difference is "$-4°$ C.", the 7th operation zone is determined as the operation zone in accordance with FIG. 6.

When the operation zone is determined in this manner, the system controller 42 checks whether the determined operation zone changes from a previously determined operation zone (step S204). For this purpose, the previously determined operation zone is stored in the memory (not shown) of the system controller 42 and compared with the operation zone determined in step S203. If the system controller 42 determines that the operation zone does not change, the drive frequency of the compressor 14 is determined from the operation zone determined in stp S203 (step S205). For example, if the operation zone is the 7th zone as described above, 130 Hz is determined as the drive frequency of the compressor 14 in accordance with FIG. 6. Thereafter, the system controller 42 checks whether a time period in which the operation zone remains unchanged reaches a set time period (step S206). If the system controller 42 determines that the set time period is not reached, the frequency determined in step S205 is used as the drive frequency of the compressor 14.

If the system controller 42 determines that the set time period is reached, i.e., if the data correction timer has counted up, the heating power is determined to be insufficient or excessive, and a sign of the value of the temperature difference ($T_c - T_{cs}$) calculated in step S202 is determined (step S207). In accordance with the determination result, the drive frequency of the compressor 14 determined in step S205 is increased/ decreased by a predetermined frequency width $\alpha$.

That is, if the temperature difference value has a plus sign, a frequency of "drive frequency determined in step S205—$\alpha$" is determined as the drive frequency of the compressor 14 (step S208). If the temperature difference value has a minus sign, a frequency of "drive frequency determined in step S205+$\alpha$" is determined as the drive frequency of the compressor 14 (step S209). If the temperature value has neither a plus nor a minus sign, this means that the temperature difference is kept in a keep zone. Therefore, "drive frequency determined in step S205" is directly determined as the drive frequency of the compressor 14 (step S210).

Referring to FIG. 6, the 2nd zone corresponds to the keep zone, and $\alpha$ is decreased when the temperature difference has a plus sign, i.e., in the 1st operation zone, and is increased when the temperature difference has a minus sign, i.e., in the 3rd to 8th operation zones. For example, if the data correction timer has counted up in the 7th operation zone, "130+$\alpha$" Hz is determined as the drive frequency of the compressor 14. Note that in the 0th operation zone, the frequency is 0, i.e., the compressor 14 is stopped and specific control is performed to set 30 Hz after a predetermined time elapses.

If the system controller 42 determines in step S204 that the operation zone changes, the drive frequency of the compressor 14 is calculated in consideration of a correction result by the data correction timer in addition to the operation zone determined in step S203 (step S211). That is, the correction data $\alpha$ is continuously used even if the operation zone changes. Therefore, for example, assume that after "130+$\alpha$" Hz is determined as the drive frequency of the compressor 14 by count up of the data correction timer in the 7th operation zone as described above, the condensation temperature $T_c$ of the indoor heat exchanger 18 further rises to increase the temperature difference $(T_c-T_{cs})$ to be "$-2°$ C.". In this case, although the operation zone changes to the 5th operation zone, not 90 Hz but "$90+\alpha$" Hz is determined as the drive frequency of the compressor 14. The highest drive frequency of the compressor 14 is 150 Hz. Therefore, the drive frequency is maintained at 150 Hz even if it is raised by $\alpha$ Hz by count up of the data correction timer in the 8th operation zone.

FIG. 6 also shows a case wherein the condensation temperature $T_c$ of the heat exchanger 18 falls. In this case, the operation zone is a "$-1$" operation zone of each operation zone used when the temperature $T_c$ rises. That is, when the temperature difference $(T_c-T_{cs})$ is "$-2°$ C." during fall of the temperature $T_c$, for example, the 4th operation zone is determined as the operation zone.

Figure 7:
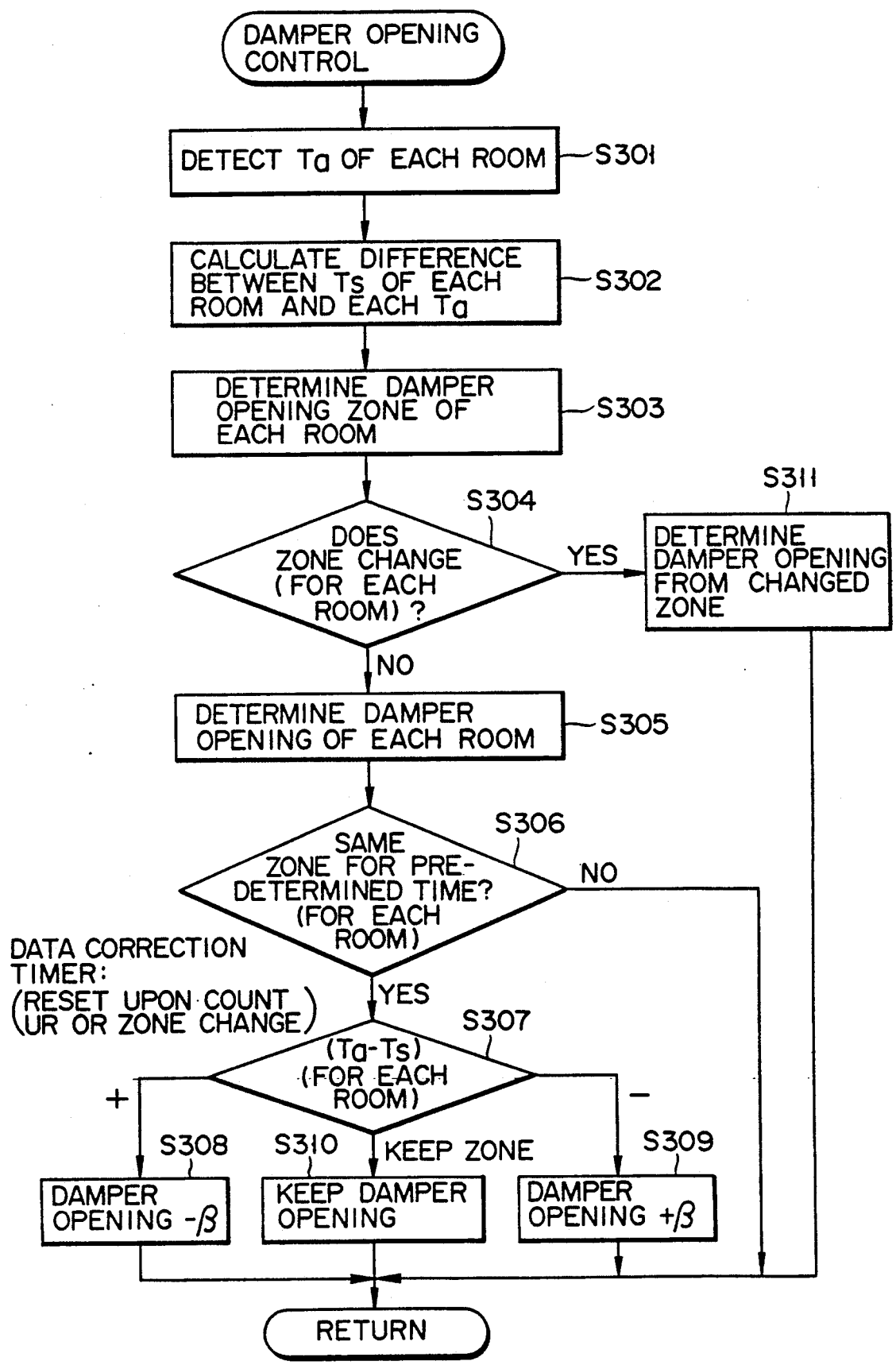
FIG. 7 is a flow chart for explaining an operation of opening control for dampers shown in FIG. 2.
Figure 8:
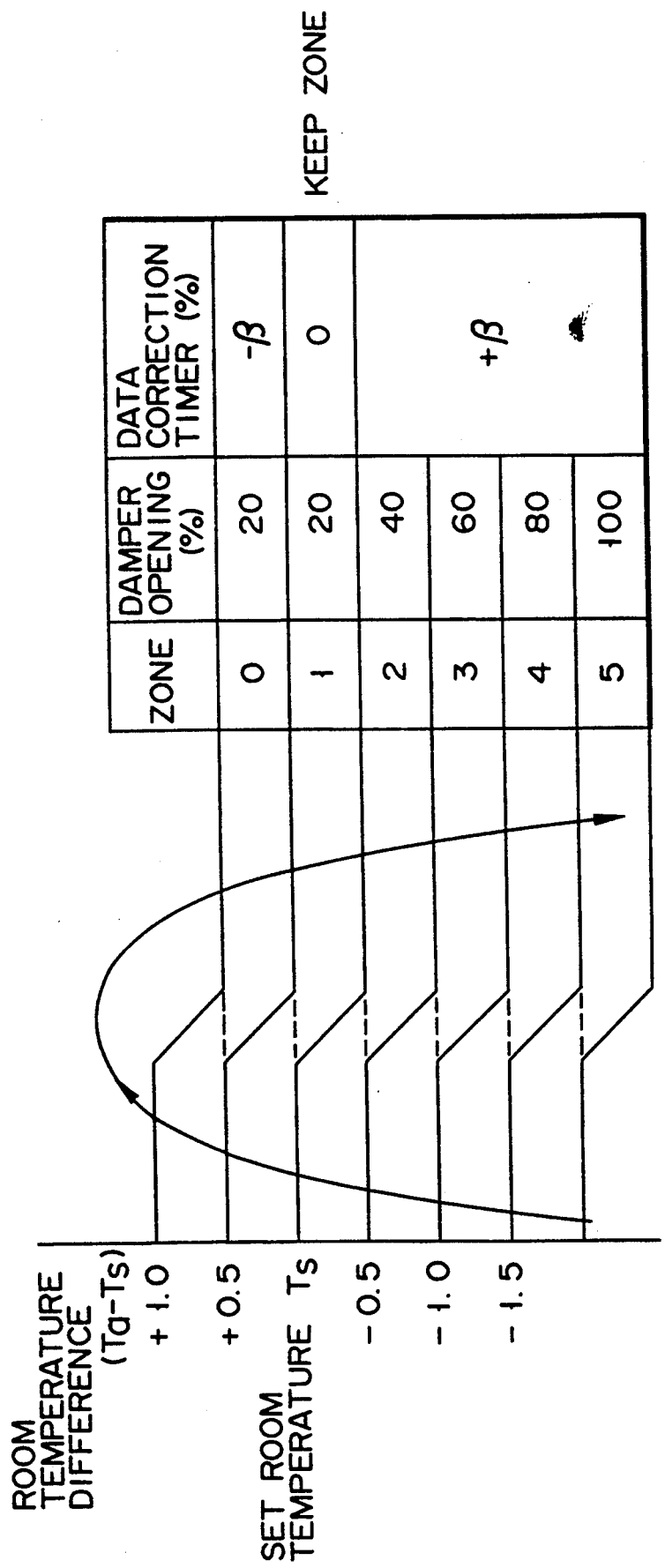
FIG. 8 is a graph showing characteristics of control based on correction data of a correction timer for determining a damper opening and a keep zone.

FIG. 7 is a flow chart for explaining an operation of the damper opening control in step S3 of the operation of the main program shown in the form of a flow chart in FIG. 4 of the duct type air conditioner according to the embodiment of the present invention, and FIG. 8 is a graph showing characteristics of control based on correction data of the data correction timer for determining the damper opening and the keep zone. A program according to this flow chart and a calculation table according to the graph are stored in the memory (not shown) of the system controller 42.

FIG. 8 will be described first before the damper opening control operation is described with reference to the flow chart in FIG. 7. That is, referring to FIG. 8, a temperature difference between a set room temperature $T_s$ of each room set by one of the input devices 34a to 34d and an actual room temperature $T_a$ of each room is plotted along the ordinate, and an opening zone corresponding to each temperature difference is shown. FIG. 8 also shows a damper opening determined by the opening zone and correction data of the data correction timer. In this case, the opening zones are set by dividing a temperature difference between the room temperature $T_a$ of each room detected by one of the room temperature sensors 36a to 36d and the set room temperature $T_s$ by a certain temperature width. Even if the temperature difference is the same, difference opening zones are determined when the room temperature has positive and negative gradients. That is, when the room temperature $T_a$ in FIG. 8 has a positive gradient, opening zones are determined by temperature widths indicated by solid lines along the abscissa. When the room temperature has a negative gradient, opening zones are determined by temperature widths indicated by broken lines along the abscissa. That is, even if the temperature difference is the same, different opening zones are when the room temperature $T_a$ has positive and negative gradients. In this case, damper openings are different and correction data of the data correction timer are also different. The term "keep zone" in FIG. 8 represents an optimal operation zone with respect to the target, i.e., an opening zone at the set room temperature $T_s$ (a temperature of an operation state which preferably continues for the longest time period).

In this embodiment, the number of opening zones is six. The number of opening zones, however, is not limited to this number but can be arbitrarily set. In this embodiment, a temperature width of each opening zone, e.g., the 3rd opening zone is set as "$-0.5°$ C. $\leq$ 3rd opening zone $< -1.0°$ C." when the room temperature $T_a$ has a positive gradient. The present invention, however, is not limited to this temperature width.

The damper opening control operation will be described below with reference to the flow chart shown in FIG. 7. For the sake of simplicity, only one room (room A) will be exemplified. It is a matter of course that this damper opening control is similarly performed for each room.

That is, upon heating, the room temperature sensor 36a mounted on the input device set in the room (room A) detects the room temperature Ta (step S301). A temperature difference $(T_a-T_s)$ between the detected room temperature $T_a$ and the set room temperature $T_s$ set beforehand in the input device 34a is calculated (step S302). An opening zone is determined on the basis of the calculated temperature difference (step S303). In order to determine the opening zone, a previous room temperature $T_a$ is stored in the memory (not shown) of the system controller 42. The system controller 42 compares the room temperature detected in step S301 with the stored previous room temperature, thereby checking whether the room temperature $T_a$ is rising or falling. If the system controller 42 determines that the room temperature is rising and the temperature difference is "$-1°$ C.", the 4th opening zone is determined as the opening zone in accordance with FIG. 8.

When the opening zone of the room is determined, the system controller 42 checks whether the determined opening zone changes from the previously determined opening zone (step S304). For this purpose, the previously determined opening zone is stored in the memory (not shown) of the system controller 42 and compared with the opening zone determined in step S303. If the system controller 42 determines that the opening zone does not change, the opening of the damper 28a of the room A is determined on the basis of the opening zone determined in step S303 (step S305). For example, if the 4th opening zone is determined as described above, 80% is determined as the opening of the damper 28a in accordance with FIG. 8. Thereafter, the system controller 42 checks whether a certain time period reaches a set time period while the opening zone remains unchanged (step S306). If the system controller 42 determines that the set time period is not reached, the opening determined in step S305 is determined as the opening of the damper 28a.

If the system controller 42 determines that the set time period is reached, i.e., if the data correction timer has counted up, a sign of the value of the temperature difference $(T_a-T_s)$ calculated in step S302 is determined (step S307). In accordance with the determination result, the opening of the damper 28a determined in step S305 is increased/decreased by a certain predetermined opening width $\beta$.

That is, if the value of the temperature difference has a plus sign, an opening of "opening determined in step $S305-\beta$" is determined as the opening of the damper 28a (step S308). If the value of the temperature difference has a minus sign, an opening of "opening determined in step $S305+\beta$" is determined as the opening of the damper 28a (step S309). If the value of the temperature difference has neither a plus nor a minus sign, this means that the temperature difference is kept in the keep zone. Therefore, the current opening of the damper 28a is maintained (step S310).

Referring to FIG. 8, the 1st opening zone corresponds to the keep zone, and $\beta$ is decreased when the temperature difference has the plus sign, i.e., in the 0th opening zone, and is increased when the temperature difference has the minus sign, i.e., in the 2nd to 5th opening zones. For example, when the data correction timer has counted up in the 4th zone, "80+$\beta$"% is determined as the opening of the damper 28a.

If the system controller 42 determines in step S304 that the opening zone changes, the opening of the damper 28a is calculated in consideration of the correction result by the data correction timer in addition to the opening zone determined in step S303 (step S311). That is, the correction data $\beta$ is continuously used even if the opening zone changes. Therefore, for example, assume that after "80+$\beta$"% is determined as the opening of the damper 28a by count up of the data correction timer in the 4th zone as described above, the room temperature further rises to decrease the temperature difference $(T_a-T_s)$ to be "$-0.5°$ C.". In this case, although the 3rd opening zone is determined as the opening zone, not 60% but "60+$\beta$"% is determined as the opening of the damper 28a. The damper can no longer widen its opening after it has opened by 100%. Therefore, the 100% opening of the damper is maintained even if the opening is widened by $\beta$% by count up of the data correction timer in the 5th opening zone.

FIG. 8 also shows a case wherein the room temperature $T_a$ falls. In this case, each opening zone is a "$-1$" opening zone of a corresponding opening zone determined when the room temperature Ta rises. That is, when the temperature difference $(T_a-T_s)$ is "$-0.5°$ C." during fall of the room temperature $T_a$, the 2nd opening zone is determined as the opening zone.

The above damper opening control is performed for each of the dampers 28a to 28d of the respective rooms.

Figure 9:
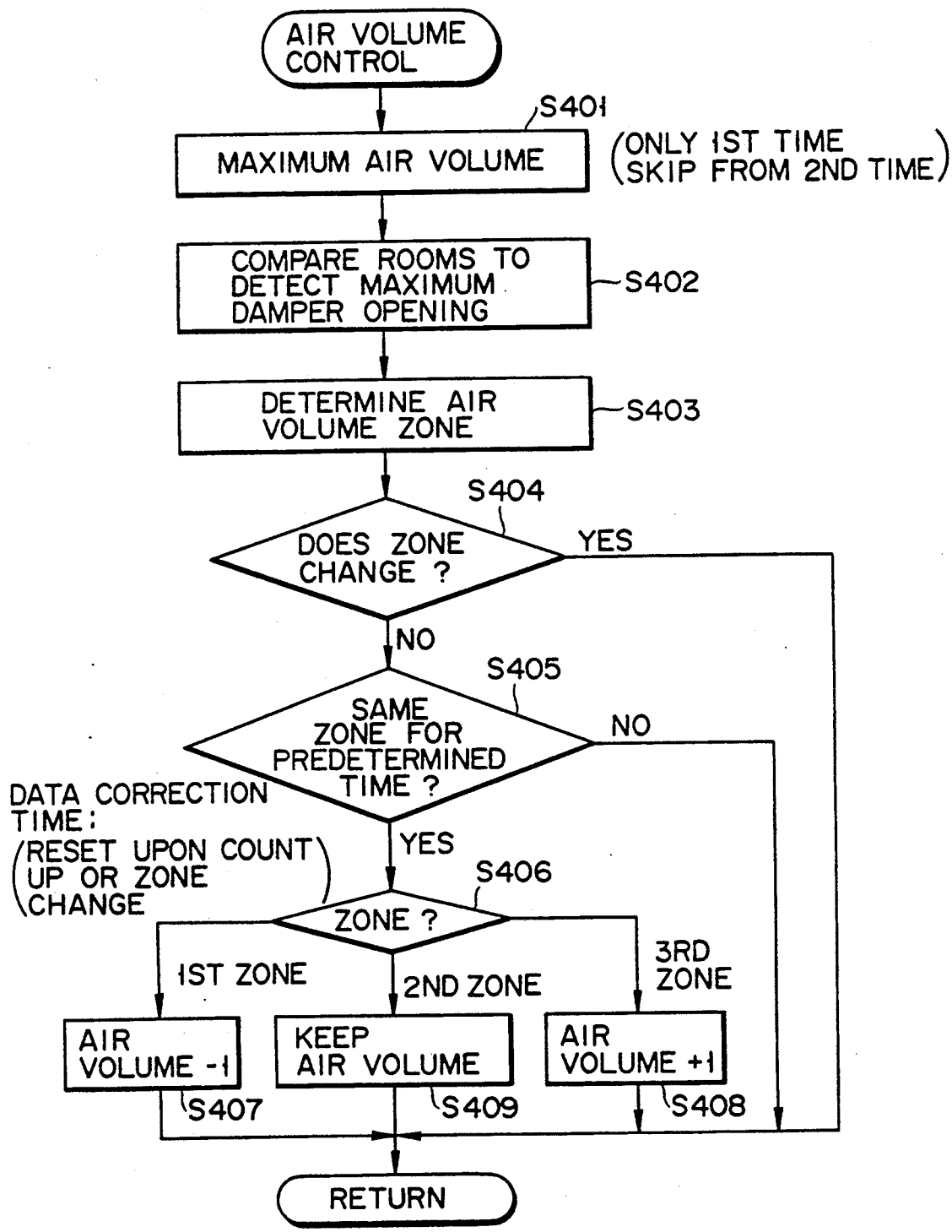
FIG. 9 is a flow chart for explaining an operation for air volume control.

FIG. 9 is a flow chart for explaining an operation of air volume control for the fan 32 in step S4 in the operation of the main program shown in the form of a flow chart in FIG. 4 of the duct type air conditioner according to the embodiment of the present invention. FIG. 10 is a control table of this air volume control. A program according to this flow chart and the control table are stored in the memory (not shown) in the system controller 42.

In this case, the term "air volume" corresponds to "strong wind", "weak wind" and "gentle wind" in an actual air conditioner and is determined by a rotational speed of the fan 32. Assume that an operation is performed by a maximum air volume (strong wind) when the operation is started (step S401).

During the steady operation, the openings of the dampers 28a to 28d of the rooms A to D are detected on the basis of the numbers of steps of the stepping motors 40a to 40d for driving the dampers, respectively, and a maximum damper opening is detected (step S402). In accordance with the detected maximum damper opening, an air volume zone is determined from the control table shown in FIG. 10 (step S403).

In this case, an opening having an arbitrary width in which the maximum damper opening is less than 100% but close to 100% is set as a damper opening keep zone and used as the 2nd air volume zone. Therefore, if the maximum damper opening detected in step S402 corresponds to the above damper opening keep zone, the 2nd air volume zone is determined as the air volume zone obtained in step S403. If the detected maximum damper opening exceeds the above damper opening keep zone and is smaller than 100%, the 3rd air volume zone is determined as the air volume zone. If the opening is less than the above damper opening keep zone, the 1st air volume zone is determined as the air volume zone. In this case, the maximum damper opening is selected in order to supply air to a room having an insufficient heat amount, i.e., since a damper of a room having an insufficient heat amount is open wider than those of other rooms.

When the air volume zone is determined as described above, the system controller 42 checks whether the determined air volume zone changes from a previously determined air volume zone (step S404). For this purpose, a previously determined air volume zone is stored in the memory (not shown) of the system controller 42 and compared with the air volume zone determined in step S403. If the system controller 42 determines that the air volume zone changes, the air volume of the fan 32 is set in correspondence with the air volume zone determined in step S403.

If the system controller 42 determines that the air volume zone does not change, it checks whether a time period in which the above air volume zone remains unchanged reaches a set time period (step S405). If the system controller 42 determines that the set time period is no reached, the air volume of the fan 32 is set in correspondence with the air volume zone determined in step S403.

If the system controller 42 determines that the set time period is reached, i.e., if the data correction timer has counted up, the air volume zone which remains unchanged is determined (step S406). In accordance with the determination result, the air volume is changed.

That is, if the 1st air volume zone remains unchanged, an air volume of "air volume corresponding to 1st air volume zone $-1$" is determined as the air volume of the fan 32 (step S407). For example, if the 1st air volume zone is set with "strong wind", the air volume is incremented by "$-1$" to set "weak wind". When "weak wind" is set, the heating power becomes insufficient. Therefore, the damper is opened, and the damper opening keep zone is returned.

If the 3rd air volume zone remains unchanged, an air volume of "air volume corresponding to 3rd air volume zone $+1$" is determined as the air volume of the fan 32 (step S408). For example, if the 3rd air volume zone is set with "weak wind", the air volume is incremented by "$+1$" to set "strong wind". When "strong wind" is set, the heating power becomes excessive. Therefore, the damper is closed, and the damper opening keep zone is returned.

If the 2nd air volume zone remains unchanged, the current air volume of the fan 32 is maintained (step S409). That is, since the air volume does not change in the 2nd air volume zone, the maximum damper opening is so controlled as to be settled in the damper opening keep zone, and a pressure loss of a duct system is decreased.

The above description of the drive frequency control for the compressor 14, the opening control for the dampers 28a to 28d and the air volume control for the fan 32 has been made assuming that the air conditioner is in a heating operation. The above control operations, however, are similarly performed in a cooling operation. Note that in the cooling operation, the plus and minus signs of the temperature difference values shown in FIGS. 6 and 8 must be reversed.

Figure 11:
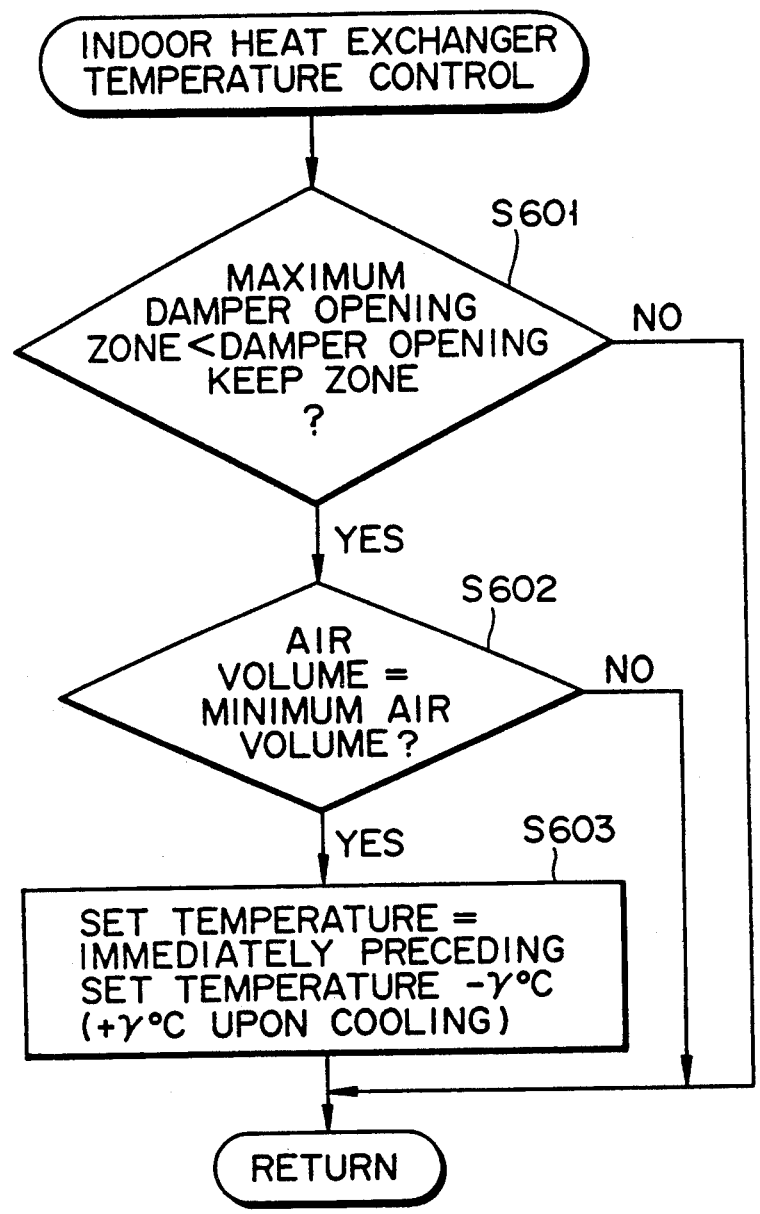
FIG. 11 is a flow chart for explaining an operation of temperature control performed by an indoor heat exchanger shown in FIG. 2.

An operation of temperature control of the indoor heat exchanger 18 in step S6 of the operations of the main program of the duct type air conditioner 10 according to the embodiment of the present invention shown in the form of a flow chart in FIG. 4 will be described below with reference to a flow chart shown in FIG. 11. Note that a program according to the flow chart in FIG. 11 is stored in the memory (not shown) of the system controller 42

That is, the controller checks whether the maximum damper opening is less than the damper opening keep zone (step S601). Only when the system controller 42 determines that the maximum damper opening is less than the damper opening keep zone, it checks whether the air volume of the fan 32 is a minimum air volume (e.g., "gentle wind") (step S602). Only when the minimum air volume is determined, i.e., only when the system controller 42 determines that the maximum damper opening is less than the damper opening keep zone and the air volume of the fan 32 is the minimum air volume, the set temperature $T_{cs}$ is controlled (step S603). That is, during heating, the set condensation temperature $T_{cs}$ is decreased by $\gamma°$ C. During cooling, the set evaporation temperature $T_{cs}$ is increased by $\gamma°$ C.

In an air conditioner using a refrigeration cycle, generally, when a condensation temperature is decreased upon heating and an evaporation temperature is increased upon cooling, an efficient operation is achieved. Therefore, even if a heating (cooling) load is low, an operation is controlled in accordance with the load.

Figure 1:
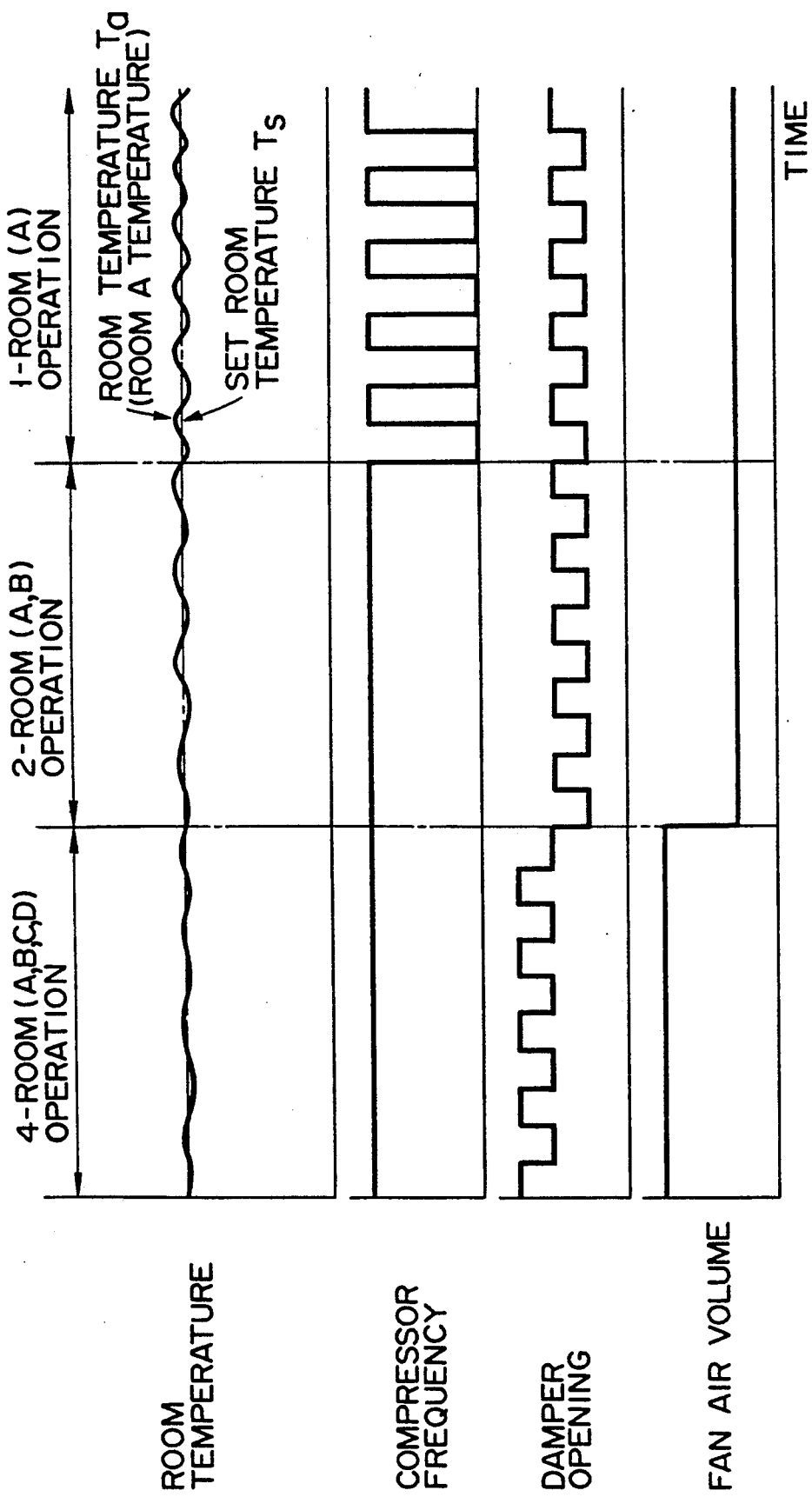
FIG. 1 is a timing chart showing characteristics of a conventional duct type air conditioner.
Figure 12:
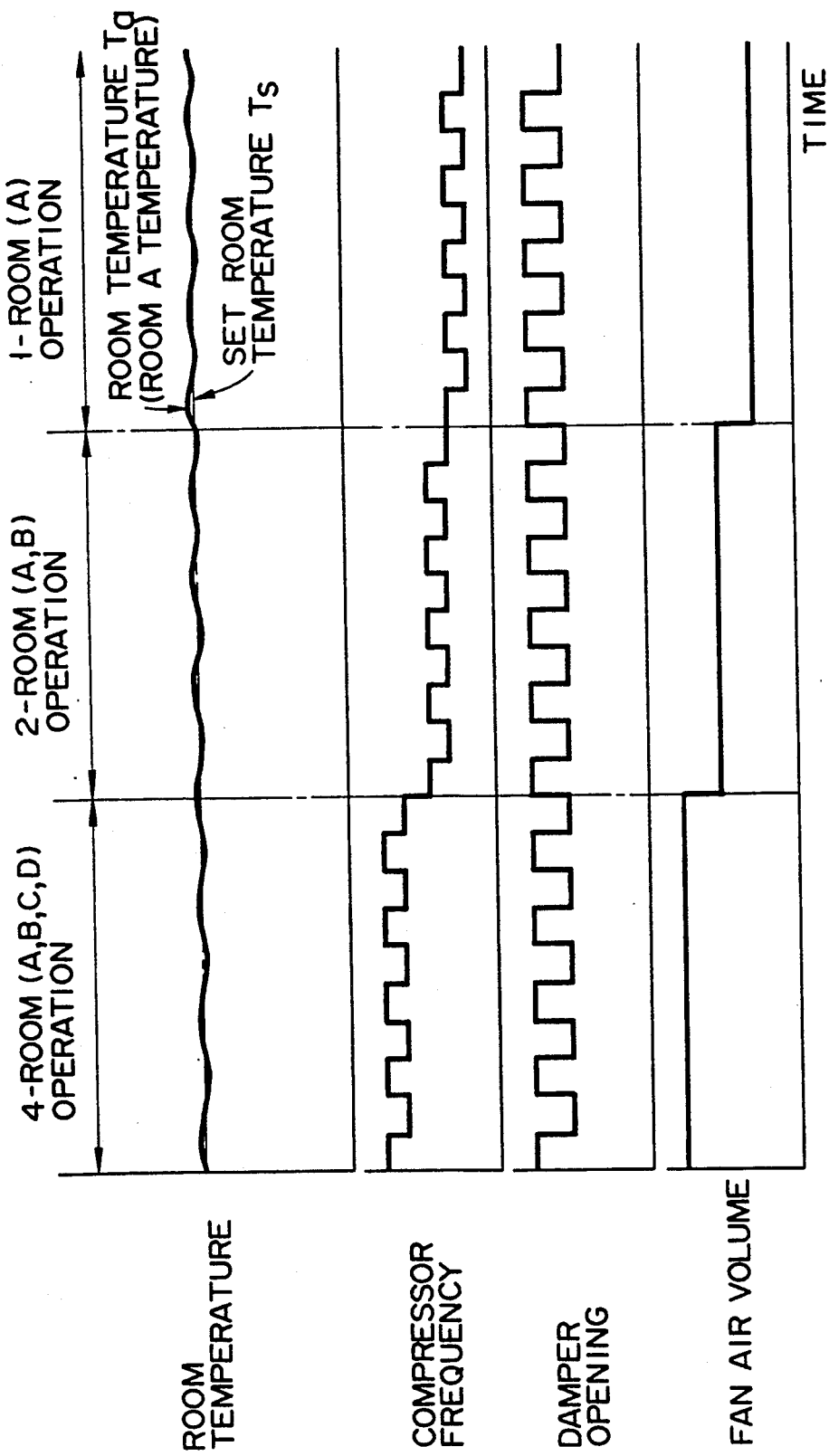
FIG. 12 is a timing chart showing characteristics of the duct type air conditioner shown in FIG. 2.

FIG. 12 is a timing chart corresponding to FIG. 1, showing characteristics obtained when the duct type air conditioner of the present invention is applied to four rooms. As can be understood from FIG. 12, the room temperature $T_a$ can be similarly, substantially maintained at the set room temperature $T_s$ during both a high cooling/heating load (four rooms) operation and a low cooling/heating load (one room) operation. That is, in the duct type air conditioner of the present invention, a variation in room temperature is small, i.e., a variation in cooling/heating power is small. In addition, even if the cooling/heating load changes, the damper opening is close to full open (100%), and its variation width is small. Therefore, the duct pressure loss is decreased to reduce operation noise.

As has been described in detail above, according to the duct type air conditioner of the present invention, the drive frequency of the compressor 14 is controlled by the temperature of the indoor heat exchanger 18, and the data correction timer is provided for each of the drive frequency control for the compressor 14, the opening control for the dampers 28a to 28d and the air volume control for the fan 32. Therefore, a variation in cooling/heating power can be decreased. Since the damper opening can be maintained to be less than full open by a predetermined width, a variation width of the cooling/heating power can be decreased to decrease a variation in room temperature. Since the set temperature of the indoor heat exchanger 18 can be adjusted in accordance with a cooling/heating load, an operation of the duct type air conditioner can be performed with a high efficiency when the cooling/heating load is low. Furthermore, even if the damper opening is maintained substantially in a full open state, wide cooling/heating power control ranging from a one-room operation to an all-room operation can be performed since the drive frequency of the compressor 14 can be controlled.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A duct type air conditioner comprising:
   heat exchanging means for receiving one of a high-temperature high-pressure refrigerant gas and a low-temperature low-pressure liquid refrigerant and heat-exchanging one of the received refrigerant gas and the received liquid refrigerant with air, thereby extracting one of condensation heat and evaporation heat;
   duct means for circulating air between a plurality of regions to be air-conditioned to be subjected to air conditioning and said heat exchanging means;
   a plurality of air volume control means, independently provided in said plurality of regions to be air-conditioned, for controlling a flow amount of air supplied rom said heat exchanging means through said duct means, wherein each said air volume control means comprises:
      means for controlling the flow amount of air in accordance with a difference between an intraregion temperature of a corresponding region to be air-conditioned and a set intraregion temperature and a holding time of the difference; and
      means for changing the flow amount of air when the difference between the intraregion temperature of the corresponding region to be air-conditioned and the set intraregion temperature does not fall within a second predetermined rage and the holding time of the difference exceeds a second predetermined time;
   temperature detecting means for detecting a temperature of the refrigerant obtained by heat exchange of one of the refrigerant gas and the liquid refrigerant with air performed by said heat exchanging means;
   control means for controlling a flow amount of one of the refrigerant gas and the liquid refrigerant to be supplied to said heat exchanging means in accordance with a difference between the temperature of the refrigerant detected by said temperature detecting means and a first set temperature and a holding time of the difference; and
   means for causing said control means to control the flow amount of one of the refrigerant gas and the liquid refrigerant before said plurality of air volume control means control the flow amounts of air.

2. A duct type air conditioner comprising:
   a refrigeration cycle as a closed cycle constituted by a variable power compressor, a four-way valve, an indoor heat exchanger, an expansive valve and an outdoor heat exchanger;
   an air supply duct for supplying air-conditioned air from said refrigerant cycle to each of a plurality of regions to be air-conditioned to be subjected to air conditioning, said air supply duct including a plurality of supply openings each for supplying the air-conditioned air to a corresponding one of said plurality of regions to be air conditioned;
   a plurality of air volume control means, independently provided in said plurality of regions to be air-conditioned, for controlling flow among of the air-conditioned air supplied from said supply openings of said air supply duct, each of said plurality of air volume control means comprising:
      a damper provided near said supply opening; and means for controlling an opening of said damper in accordance with a difference between an intraregion temperature of a corresponding region to be air-conditioned and a set intraregion temperature and a holding time of the difference;

a return duct for returning air from said plurality of regions to be air-conditioned to said refrigeration cycle;

temperature detecting means for detecting a temperature of said indoor heat exchange of said refrigerant cycle;

control means for controlling a drive frequency of said variable power compressor of said refrigerant cycle in accordance with a difference between the temperature of said indoor heat exchanger detected by said temperature detecting means and a preset temperature of said indoor heat exchanger, wherein said control means comprises:

means for controlling the drive frequency of said variable power compressor before said air volume control means control the air volumes of air;

means for controlling the drive frequency of said variable power compressor of said refrigeration cycle in accordance with the difference between the temperature of said indoor heat exchanger detected by said temperature detecting means and the preset temperature of said indoor heat exchanger and a holding time of the difference; and means for changing the drive frequency of said variable power compressor when the difference between the temperature of said indoor heat exchanger detected by said temperature detecting means and the preset temperature of said indoor heat exchanger does not fall within a first predetermined range and the holding time of the difference exceeds a first predetermined time.

3. The air conditioner according to claim 2, wherein each of said air volume control means includes means for changing the opening of said damper when the difference between the intraregion temperature of the corresponding region to be air-conditioned does not fall within a second predetermined range and the holding time of the difference exceeds a second predetermined time.

4. The air conditioner according to claim 2, wherein each of said air volume control means includes means for holding the opening of said damper within a range of a predetermined width smaller than full open.

5. The air conditioner according to claim 4, further comprising means for adjusting the preset temperature of said indoor heat exchanger when the opening of said damper falls outside the range of the predetermined width.

6. The air conditioner according to claim 5, further comprising:

a fan, provided in said air supply duct, for supplying air which is air-conditioned by said refrigeration cycle; and fan control means for detecting a maximum opening of the openings of said dampers of said plurality of air volume control means and controlling said fan in accordance with the maximum opening.

7. The air conditioner according to claim 6, wherein said fan control means includes means for changing a rotational amount of said fan when the maximum opening is not an opening falling within the range of the predetermined width and the maximum opening remains unchanged for a third predetermined time.

8. A method of controlling a duct type air conditioner, said duct type air conditioner comprising: indoor heat exchanging means for receiving one of a high-temperature high-pressure refrigerant gas and a low-temperature low-pressure liquid refrigerant and heat-exchanging one of the received refrigerant gas and the received liquid refrigerant with air, thereby extracting one of condensation heat and evaporation heat; flow amount varying means for varying a flow amount of one of the refrigerant gas and the liquid refrigerant to be supplied to said indoor heat exchanging means; duct means for circulating air between a plurality of regions to be air-conditioned to be subjected to air conditioning and said indoor heat exchanging means, said duct means including a plurality of supply openings for supplying air from said indoor heat exchanging means to said plurality of regions to be air-conditioned and a fan, provided in said duct means, for supplying air from said indoor heat exchanging means; a plurality of air volume control means, independently provided in said plurality of regions to be air-conditioned, for controlling flow amounts of air supplied from said indoor heat exchanging means through said duct means, each of said air volume control means including a damper provided near said supply opening; temperature detecting means for detecting a temperature of the refrigerant obtained by heat exchange of one of the refrigerant gas and the liquid refrigerant with air performed by said indoor heat exchanging means; and a plurality of temperature sensor means, each provided in a corresponding one of the regions to be air-conditioned to detect an intraregion temperature of the region to be air-conditioned, comprising the steps of:

calculating a difference between the temperature of the refrigerant detected by said temperature detecting means and a first set temperature which is preset;

determining, in accordance with the calculated difference, a flow amount of one of the refrigerant gas and the liquid refrigerant varied by said flow amount varying means and supplied to said heat exchanging means;

calculating a difference between a temperature in each of the regions to be air-conditioned detected by a corresponding one of said plurality of temperature sensors and a corresponding one of second set temperatures which are preset for the respective regions to be air-conditioned;

determining an opening of each of said dampers of the regions to be air-conditioned in accordance with a corresponding one of the calculated temperature differences;

selecting a maximum damper opening of the determined damper openings;

determining a rotational speed of said fan in accordance with the selected maximum damper opening; and controlling the first set temperature when cooling-/heating power of said duct type air conditioner is higher than a cooling/heating load of the regions to be air-conditioned.

9. The method according to claim 8, wherein said step of controlling the first set temperature includes the step of increasing the first set temperature upon heating and decreasing the first set temperature upon cooling.

10. The method according to claim 8, wherein said step of determining the flow amount of one of the refrigerant gas and the liquid refrigerant includes the step of changing the flow amount of one of the refrigerant gas and the liquid refrigerant when the difference between the temperature of the refrigerant detected by said temperature detecting means and the first set temperature does not fall within a first predetermined range and a holding time of the difference exceeds a first predetermined time.

11. The method according to claim 8, wherein said step of determining the damper opening includes the step of changing the opening of said damper of each region to be air-conditioned when the difference between the temperature of the region to be air-conditioned detected by a corresponding one of said plurality of temperature sensor means and a corresponding one of the second set temperature does not fall within a range of a second predetermined range and a holding time of the difference exceeds a second predetermined time.

12. The method according to claim 8, wherein said step of determining the rotational speed of said fan includes the step of changing the rotational speed of said fan when the selected maximum opening is not an opening falling within a range of a predetermined width and remains unchanged for a third predetermined time.

* * * * *